(12) United States Patent
Papakos et al.

(10) Patent No.: US 7,412,125 B2
(45) Date of Patent: Aug. 12, 2008

(54) OPTICAL DISPERSION COMPENSATION

(75) Inventors: Kimon Papakos, Chicago, IL (US); Kenneth M. Fisher, Aurora, IL (US); Richard C. Younce, Yorkville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 11/281,931

(22) Filed: Nov. 16, 2005

(65) Prior Publication Data
US 2006/0263005 A1  Nov. 23, 2006

Related U.S. Application Data

(60) Provisional application No. 60/675,620, filed on Apr. 28, 2005.

(51) Int. Cl.
*G02B 6/28* (2006.01)
(52) U.S. Cl. .................................. 385/24; 398/159
(58) Field of Classification Search ........................ None
See application file for complete search history.

(56) References Cited

U.S. PATENT DOCUMENTS

| 5,361,319 | A | 11/1994 | Antos et al. | |
|---|---|---|---|---|
| 6,304,696 | B1 * | 10/2001 | Patterson et al. | 385/37 |
| 6,823,123 | B2 | 11/2004 | Rathje | |
| 2001/0028758 | A1 * | 10/2001 | Abbott et al. | 385/24 |
| 2003/0071985 | A1 * | 4/2003 | Mori et al. | 356/73.1 |
| 2003/0086647 | A1 | 5/2003 | Willner et al. | |
| 2005/0036752 | A1 | 2/2005 | Burke et al. | |
| 2005/0220400 | A1 | 10/2005 | Shibata | |
| 2005/0220409 | A1 | 10/2005 | Guerin et al. | |
| 2005/0226554 | A1 | 10/2005 | Kawanishi et al. | |
| 2005/0244164 | A1 | 11/2005 | Miyashita | |

FOREIGN PATENT DOCUMENTS

| EP | 1030472 A2 | 8/2000 |
|---|---|---|
| EP | 1347589 A1 | 9/2003 |

OTHER PUBLICATIONS

EPO, International Search Report for PCT Application No. PCT/US2006/016660 (Sep. 1, 2006).
EPO, Written Opinion for PCT Application No. PCT/US2006/016660 (Sep. 1, 2006).
D.J. Moss, et al., "Multichannel tunable dispersion compensation using all-pass multicavity etalons", Photon Engineering Party, Ltd., Adelaide, Australia, 2002.
Tapio Niemi, Dissertation "Dispersion measurements of fiber-optic components and applications of a novel tunable filter for optical communications", Helsinki University of Technology, Espoo, Finland, 2002.
Peter Kirkpatrick, et al., "10 Gb/s Optical Transceivers: Fundamentals and Engineering Technologies", Intel Technology Journal, vol. 8, No. 2, pp. 83-99, May 10, 2004.

* cited by examiner

*Primary Examiner*—Sung Pak
*Assistant Examiner*—Chad H Smith
(74) *Attorney, Agent, or Firm*—Davis & Associates; William D. Davis

(57) ABSTRACT

A method of providing dispersion compensation includes providing a dispersion signal indicative of an amount of dispersion for at least one channel of a multi-channel optical signal. A dispersion compensator is controlled in accordance with the dispersion signal to optically compensate for the dispersion of the optical signal.

20 Claims, 6 Drawing Sheets

OPTICAL DISPERSION COMPENSATION

CROSS-REFERENCE TO RELATED APPLICATIONS

This application claims the benefit of provisional patent application No. 60/675,620 filed Apr. 28, 2005 which is herein incorporated by reference in its entirety.

BACKGROUND

Optical fiber communications experience degradation due to various physical properties of the optical fiber. Other network elements may also contribute to the degradation of the signal. This degradation tends to limit the distance over which information can be effectively communicated. For example, the propagation velocity of an optical signal within an optical fiber is wavelength dependent. Due to the spectral content of a pulse, the optical pulses tend to become spread out or broadened through a phenomenon referred to as material or chromatic dispersion.

Various compensation techniques have been developed to mitigate the effects of dispersion. Optical dispersion compensation modules (ODCMs) are sometimes used in an effort to compensate for unwanted chromatic dispersion. One type of ODCM utilizes spools of dispersion compensating fiber (DCF) to ameliorate the chromatic dispersion contributed by the primary optical fiber.

One disadvantage of this approach is the labor-intensive nature of determining and implementing the appropriate compensation. A technician must select the appropriate length DCF spool for the ODCM. Another disadvantage of such ODCMs is the need to rely on commercially available spools of pre-determined lengths of DCF rather than custom-length DCF. The granularity of commercially available spool lengths leads to less-than-optimal compensation.

Perhaps most importantly, changes to the amount of compensation inherently require the undesirable interruption of data transport. Changes require technician scheduling lead time and interruption of data transport to exchange DCF spools. The static nature of DCF compensation is also incapable of handling time-varying dispersion.

SUMMARY

A method of providing dispersion compensation includes providing a dispersion signal indicative of an amount of dispersion for at least one channel of a multi-channel optical signal. A dispersion compensator is controlled in accordance with the dispersion signal to optically compensate for the dispersion of the optical signal.

An apparatus includes a dispersion calculator providing a dispersion signal representing an amount of dispersion associated with at least one channel of a multi-channel optical signal. A compensator is controlled in accordance with the dispersion signal to optically compensate for dispersion of the multi-channel optical signal.

DETAILED DESCRIPTION

Figure 1:
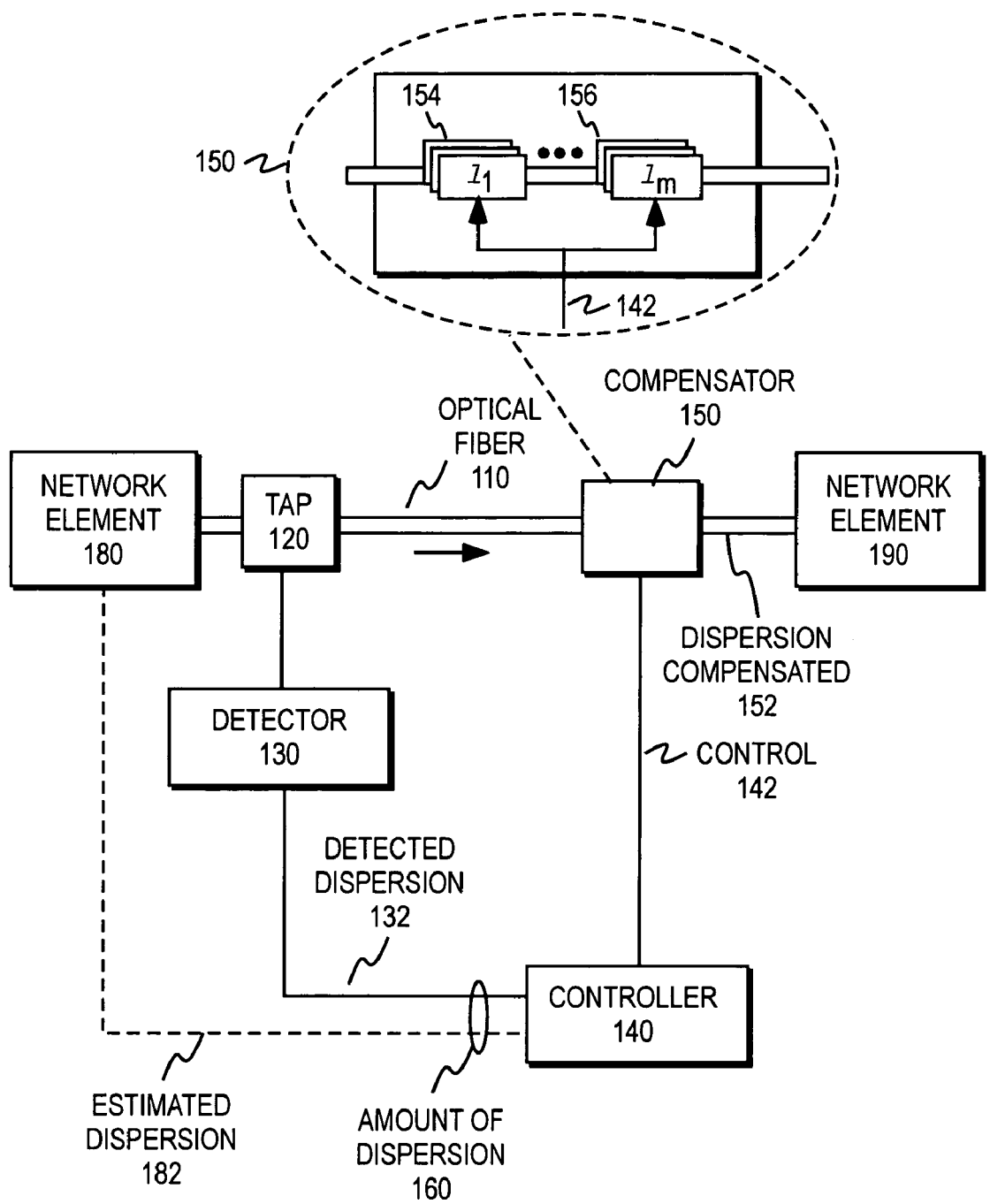
FIG. 1 illustrates one embodiment of a dispersion compensation apparatus.

Wavelength division multiplexing (WDM) uses different wavelengths of light to permit concurrent transmission of multiple streams of data on the same optical fiber. Each wavelength or lambda is associated with a distinct optical data channel. The term "light path" may be used to refer to the route taken by a specific channel. Digital data is communicated on individual channels by pulsing the channel's associated optical source. Dense wavelength division multiplexing (DWDM) is a term indicative of the density or spacing of such concurrent channels on the same optical fiber. The term WDM may be used to generically refer to all wave division multiplexing technologies regardless of the number or density of channels unless specifically noted otherwise.

The propagation velocity of the optical signal carried by the optical fiber is wavelength dependent. Due to the spectral content of a pulse, the optical pulses tend to become spread out or broadened through a phenomenon referred to as material or chromatic dispersion. The power of the optical signal may be increased to offset the reduced pulse power content. Due to a nonlinear dependence of the refractive index of the fiber on the power of the optical signal, however, increasing the power of the optical signal results in a nonlinear phase shift that itself induces further pulse spreading. Thus dispersion compensation typically entails trading off of various parameters.

Static ODCMs are typically deployed at strategic locations within the network to provide select amounts of dispersion compensation at each respective location. The strategic placement of ODCMs within the network, as well as the amount of dispersion compensation provided at such locations, are factors that are typically selected in response to a manual examination of the dispersion characteristics of the network. In addition to being a manual process, the optical fiber must cease optical data transport (i.e., "dark fiber") while dispersion measurements take place. Dark fiber requirements of this sort can result in an undesirable interruption or delay of service.

The amount of dispersion compensation and the resolution of such compensation can further complicate network design. The finest ODCM dispersion compensation resolution available for a given network application can be large enough to restrict what might otherwise be a more flexible network design opportunity.

Effective or efficient deployment of ODCMs may also be hampered when important characteristics of the network are either unknown or subject to change, or where there are a variety of locations at which services are added and dropped from the network. Moreover, changes in network traffic rates, the addition of or other changes to services provided between locations, or changes in network architecture can cause the dispersion patterns of the network to change significantly. Such circumstances create a significant challenge for efficiently and effectively determining the dispersion characteristics of the network, and compensating for dispersion through the use of manually deployed static ODCMs.

Dispersion compensation thus often remains a significant challenge in the design, deployment, and operation of modem optical communication networks. A network designer, for example, may be required to plan network routes that vary greatly in the add (A) and drop (Z) point for each light path. In these circumstances, the management of dispersion can become increasingly complicated.

The network designer often falls into an iterative loop attempting to simultaneously satisfy all the existing light paths and additional light paths requirements. The complication grows even larger if one or more multi-degree nodes are introduced into the network. The solution may require meaningful change to the original design or operation of the network. Network redesign can be very complicated as well as disruptive from a service perspective. Even a redesigned network can encounter unforeseen traffic demands that may again require meaningful changes in the design or operation of the network.

FIG. 1 illustrates one embodiment of an optical dispersion compensation apparatus. Network elements 180 and 190 are coupled to each other and communicate with each other via an optical fiber 110. An amount of dispersion 160 can be determined by estimation or by detection.

One approach for detecting the dispersion includes an optical tap 120. Tap 120 senses the optical signal carried by optical fiber 110. In particular, tap 120 optically taps the signal subject to dispersion. Detector 130 provides a detected dispersion 132 as the amount of dispersion 160 for controller 140. Other methods and apparatus are suitable for detecting the amount of dispersion. The detector may incorporate a processor for computing the detected dispersion.

In an alternative embodiment, a network element 180 may be used to provide an estimated dispersion 182 as the amount of dispersion 160 for controller 140. The network element may include a processor for computing the estimated dispersion.

The term "dispersion calculator" will be used to refer to any device providing the dispersion signal without regard to whether the dispersion signal represents an estimated or a detected amount of dispersion.

Controller 140 generates a control signal 142 in response to the amount of dispersion 160 provided either through estimation or detection. Compensator 150 provides optical domain dispersion compensation in response to the control signal. The resulting optical signal is dispersion compensated 152.

Figure 2:
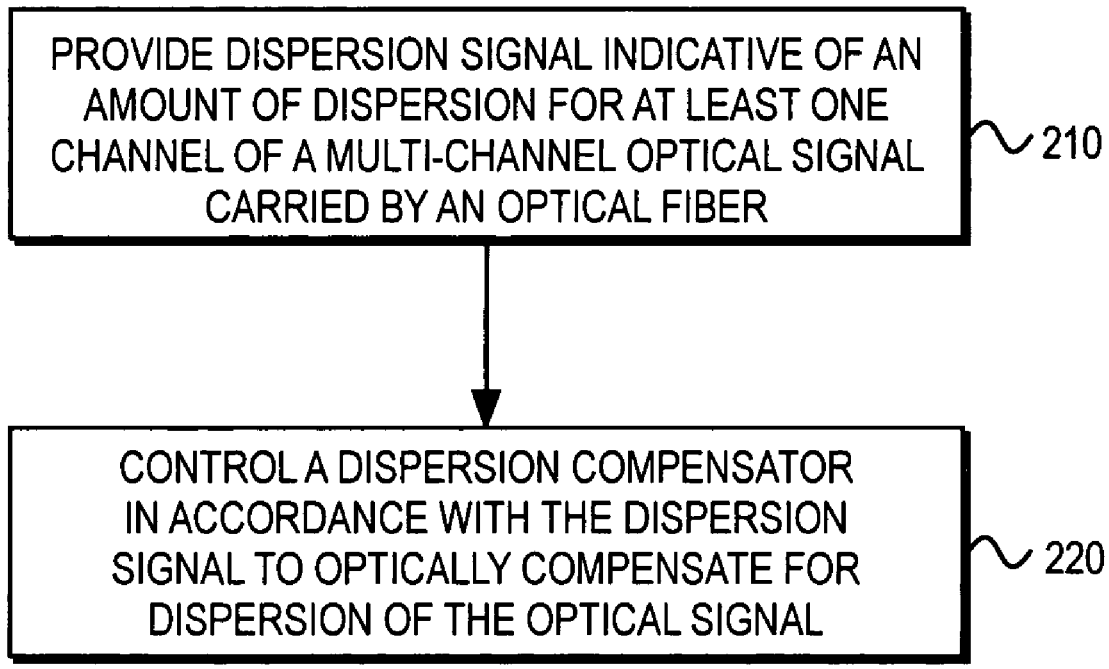
FIG. 2 illustrates one embodiment of a method of providing dispersion compensation.

FIG. 2 illustrates one embodiment of a method of operating the apparatus of FIG. 2 to provide dispersion compensation. In step 210 a dispersion signal is provided. The dispersion signal is indicative of the amount of dispersion associated with at least one channel of a multi-channel optical signal carried by an optical fiber. In step 220, a dispersion compensator is controlled in accordance with the dispersion signal to compensate for dispersion of the optical signal. In one embodiment, the compensator receives one or more control signals from the controller that causes the compensator to deliver dispersion compensation tailored to eliminate or significantly reduce the measured dispersion.

The apparatus of FIG. 1 and the method of FIG. 2 permit in-service dispersion compensation without interruption of data transport channels. The WDM optical signal communicated on the fiber may include one or more overhead or supervisory channel(s) reserved for performing supervisory functions relating to operating, maintaining, and controlling the optical network. The overhead or supervisory channel(s) can take the form of, for example, one or more distinct wavelengths within the WDM signal. The supervisory channel may have spectral characteristics or other information that can be used to determine dispersion information.

The supervisory channel may thus act as a proxy for determining the dispersion associated with various WDM channels. Measurement of the dispersion associated with a specific channel (e.g., supervisory channel) may be used to estimate the dispersion specific to any channel within the same optical fiber span.

Figure 3:
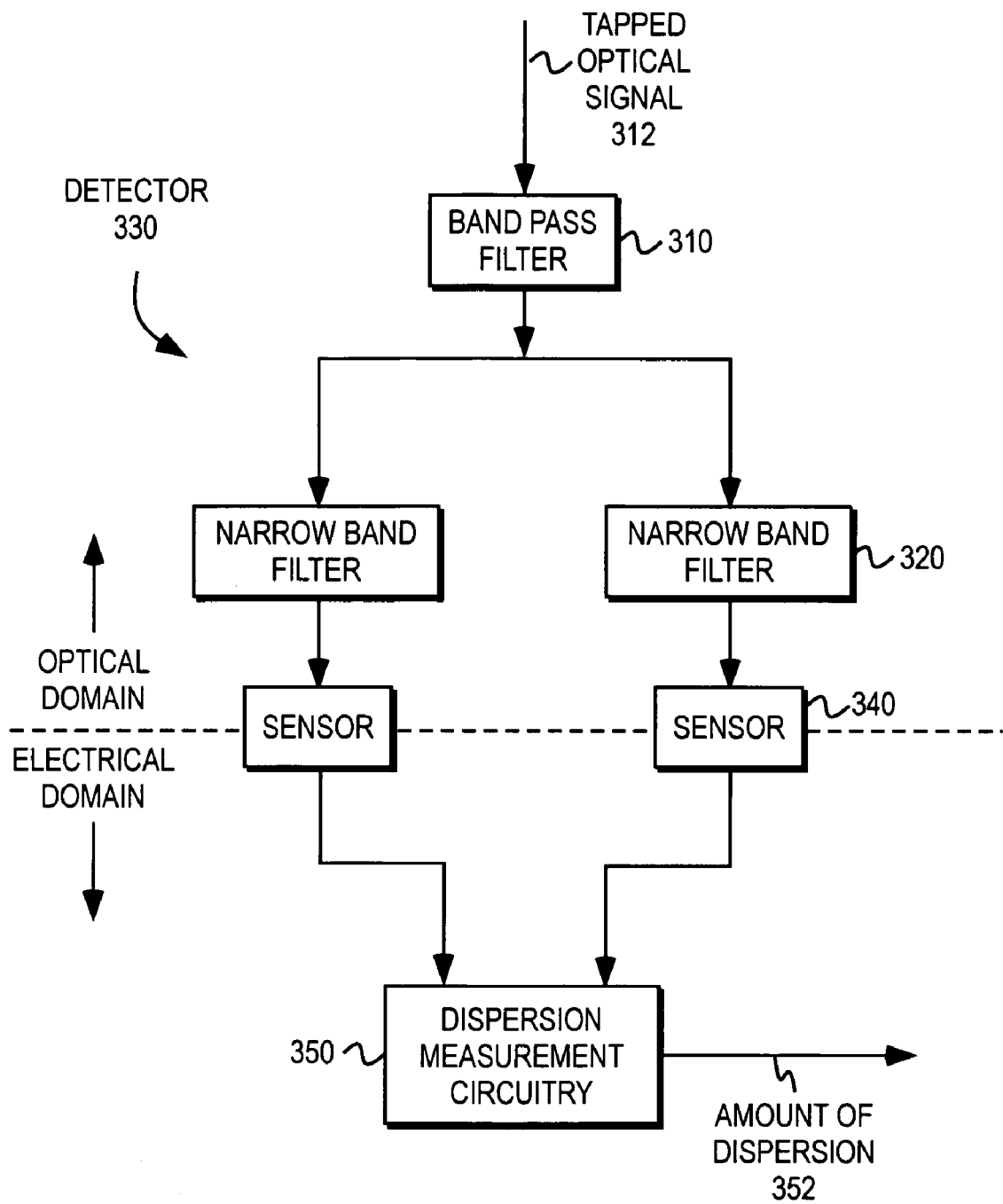
FIG. 3 illustrates one embodiment of detecting an amount of chromatic dispersion.

FIG. 3 illustrates one embodiment of an apparatus for generating the dispersion signal such as that generated by detector 130 of FIG. 1. In one embodiment, the dispersion of interest is chromatic dispersion. Detector 330 receives the tapped optical signal 312. A band pass filter 310 eliminates the optical channels that are not of interest for the dispersion measurement. The resulting optical signal is provided to a plurality of notch filters (i.e., narrow band filter 320).

Although the band pass filter is indicated as being applied to a tapped optical signal in the illustrated embodiment, the tapping apparatus may also perform the bandpass filtering. For example, in one embodiment a diplex filter (not illustrated) may be used to provide a tapped optical signal that is also band pass limited.

Each narrow band filters 320 is associated with a distinct channel of the optical signal. Thus the narrow band filters 320 have different center frequencies. By communicating the identical pulse on a plurality of channels, the propagation velocity differences between channels can be directly measured by delays between detection of the pulse.

In an alternative embodiment, a pulse is communicated on a single channel such as a supervisory channel. Narrow band filters 320 have different center frequencies in order that each may be associated with a different spectral component of the communicated pulse. The propagation velocity differences for different spectral components can be directly measured by delays for the pulse associated with each spectral component.

Each narrow band filter 320 has an associated sensor 340 that provides the optical-to-electrical domain conversion. Sensor 340, for example, converts the filtered optical signal to the electrical domain through the use of a P-I-N photodiode or other converter technology, such as for example an avalanche photo diode (APD) or other optical receiver technology. The optical pulse received by each sensor 340 is thus converted to an associated electrical signal and provided to the dispersion measurement circuitry 350. In one embodiment, the dispersion measurement circuitry 350 operates in the electrical domain. The dispersion measurement circuitry measures the relative delay between the time of arrival of, or the relative phase difference between the electrical signals. The relative delays or phase differences correspond to the propagation velocity differences between spectral components of different frequencies.

The number of narrow band filters used is dependent upon the desired granularity of determination of the chromatic dispersion. Although two narrowband filters and associated sensors are illustrated, alternative embodiments might use a greater number of narrow band filters and sensors.

The dispersion measurement circuitry 350 provides an amount of dispersion signal 352 indicative of an amount of dispersion. Referring to FIG. 1, the amount of dispersion signal is provided to controller 140. The measurement circuitry may be either distinct from or form a portion of controller 140.

In one embodiment, the bandpass filter selects the supervisory channel for measuring dispersion. One significant advantage of using the supervisory channel is that there is no need to interrupt data transport of payload channels. Thus in one embodiment, bandpass filter 310 is tuned to select the supervisory channel for determining dispersion.

The amount of dispersion may also be estimated rather than detected. Knowledge of the length of the fiber optic span between two network elements combined with knowledge of the dispersion characteristics of the span enables an estimation of the amount of dispersion.

Figure 4:
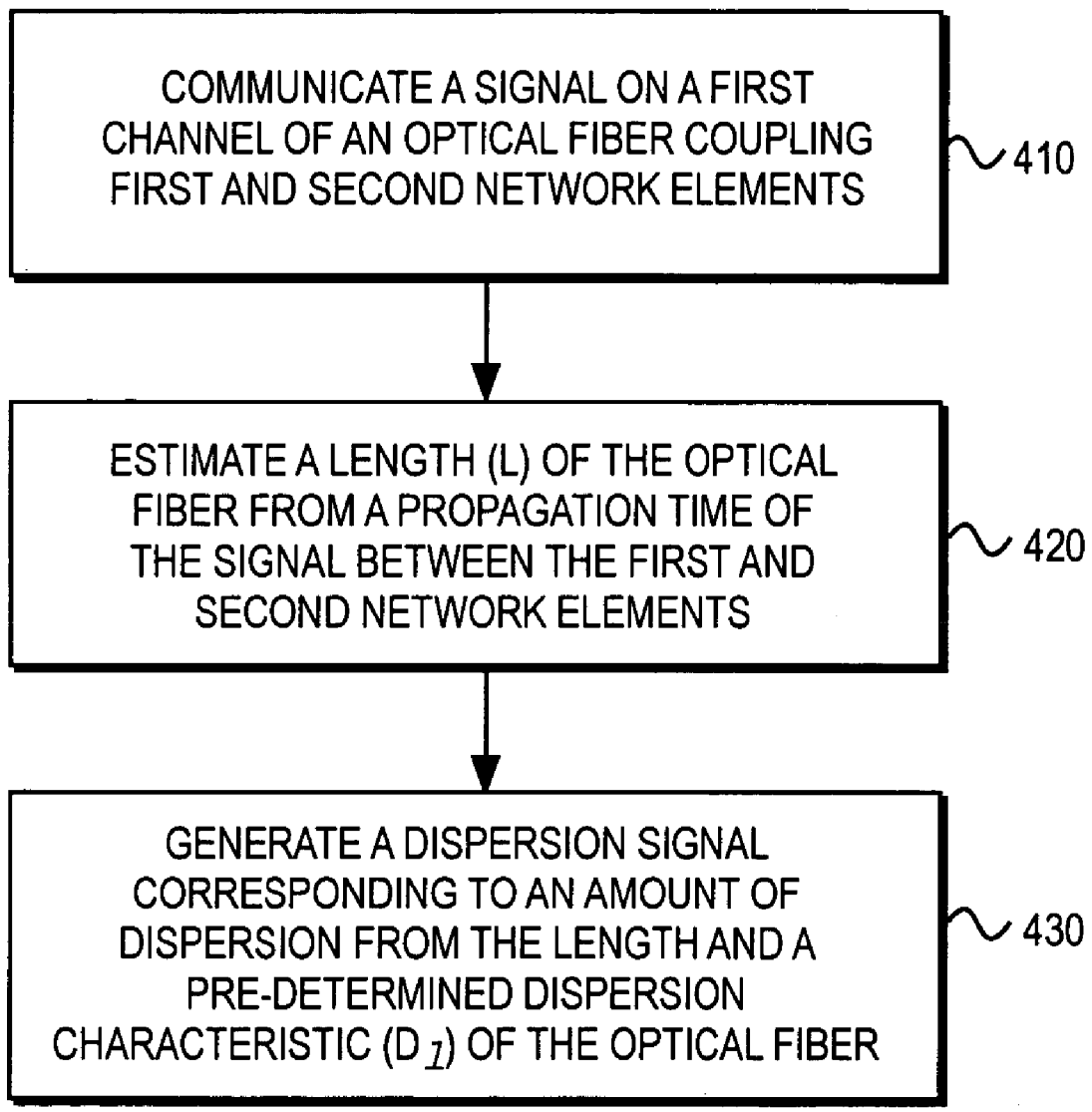
FIG. 4 illustrates an alternative embodiment of a method of detecting an amount of chromatic dispersion.

FIG. 4 illustrates one embodiment of a method of providing a dispersion signal based on an estimated dispersion. One approach for determining the length of the fiber optic span between two network elements is set forth in steps 410 and 420.

A signal is communicated on a first channel of an optical fiber coupling a first network element to a second network element in step 410. A signal transmitted from the first network element to the second network element may, for example, be looped back to the first network element. The first network element can then estimate the length of optical fiber coupling the first and second network elements from the signal propagation time on the first channel in step 420.

The propagation velocity $v_\lambda$ of a signal at a wavelength of interest is a pre-determined characteristic of the fiber. For a propagation time t, the length (L) of the fiber can be determined as $$L = \frac{v_\lambda}{t}.$$

If "t" is time for a loopback, then $$L = \frac{v_\lambda}{2t}$$

because t represents a roundtrip time between the first and second network elements.

In step 430, a dispersion signal is generated based on the length of the optical fiber and a pre-determined dispersion characteristic of the fiber. For example, one optical fiber manufacturer (Corning Incorporated of Corning, N.Y.) has a single mode fiber product (SMF-28) that is prevalent in optical communication networks. One formula for the chromatic dispersion of Corning's SMF-28 optical fiber is as follows:

$$D_\lambda = \frac{S_0}{4}\left(\lambda - \frac{\lambda_0^4}{\lambda^3}\right),$$

wherein
  $\lambda$ is the wavelength of interest (nm)
  $\lambda_0$ is the zero chromatic dispersion wavelength (nm) (typically around 1300-1320 nm)
  $S_0$ is a product specific value (ps/nm$^2$·km) (e.g., 0.092 ps/nm$^2$·km)
  $D_\lambda$ is the chromatic dispersion at $\lambda$ (ps/nm/km)

The formula is specific to the properties of the fiber. The SMF-28 product is a non-dispersion shifted fiber (Non-DSF), Other fibers such as dispersion shifted fiber (DSF), (+D) NZ-DSF, (−D) NZ-DSF, shift the zero dispersion wavelength to other spectral locations and may have very different chromatic dispersion profiles. (+D) and (−D) NZ-DSF, for example, move the zero dispersion wavelengths to locations outside of the typical DWDM range around 1550 nm. The different fibers, however, exhibit opposite chromatic dispersion slopes with wavelength. (−D) for example, exhibits a negative dispersion slope with wavelength while (+D) exhibits a positive dispersion slope with wavelength. A chromatic dispersion formula, however, is typically available from the manufacturer of the fiber.

For the illustrated example, the estimated amount of dispersion is $D_\lambda \cdot L$, wherein L is the length of the span between the network elements. A dispersion signal corresponding to $D_\lambda \cdot L$ is provided to the controller 130.

Referring to FIG. 1, once the amount of dispersion 160 is determined either as a detected dispersion 132 or an estimated dispersion 182, the necessary amount of compensation can be determined. Controller 140 provides the appropriate control signal to vary the amount of compensation in accordance with the amount of dispersion 160.

In one embodiment, the dispersion signal indicates the amount of dispersion associated with each of a plurality of wavelengths. In an alternative embodiment, the detector provides a signal indicative of the amount of dispersion for a given wavelength and the controller extrapolates this information to determine the amount of dispersion associated with other wavelengths based upon the pre-determined dispersion characteristics of the optical fiber. In either case, the controller provides the appropriate control signal to the compensator to handling compensation for dispersion at a plurality of wavelengths (i.e., for a multi-channel optical signal).

Various control algorithms may be implemented by controller 140. For example, the elements of FIG. 1 may co-operate to ensure dispersion is continuously being monitored and corrected such that compensation is continuously variable in time. Alternatively, compensation may be varied only at periodic intervals. In yet another embodiment, changes to the compensation are made only in response to a manually initiated command to the controller. The controller may operate in an open loop or a closed loop fashion.

Referring to FIG. 1, the compensator compensates for dispersion entirely within the optical domain. In one embodiment, the type of dispersion compensation provided is chromatic dispersion compensation. In various embodiments, compensator 150, for example, may include compensation devices 154, 156 such as deformable micro-electromechanical systems (MEMS) mirror arrays, fiber Bragg gratings, tunable etalon filters, phase shifting planar waveguides, or tunable diffraction gratings.

In order to provide compensation for a multi-channel optical fiber, the compensator may cascade a plurality of variable single channel compensators. The compensator 150, for example, may include multiple sets 154, 156 of each of the variable compensation devices wherein each set is associated with a specific wavelength or a narrow distinct range of wavelengths as denoted by $\lambda_1, \ldots \lambda_m$. The compensator may provide a different amount of compensation to different wavelengths.

When providing chromatic dispersion compensation, compensator 150 reduces the existing dispersion by adjusting the group delay of the dispersion-affected signal in the optical domain. Compensator 150 effectively reshapes pulses occurring in the optical signal. In particular, broadened optical pulses occurring in one or more channels are narrowed by the compensator such that the chromatic dispersion is effectively reduced or eliminated. In various embodiments, the compensator may be co-located with the detector such that compensation is being performed on the same signal tapped for the detector.

In the preceding examples, the total amount of dispersion compensation ($D_T$) needed was presumed to be attributable to the amount of dispersion associated with the current span ($D_{Cn}$). In some cases, however, there may be dispersion accumulated from prior spans in the optical signal path. Generally, the amount of dispersion to be compensated for is as follows:

$$D_T = D_{Cn} + D_{ACCn},$$

where $D_T$ indicates the amount of dispersion compensation needed, $D_{Cn}$ represents the detected or estimated dispersion associated with the current (n) span, and $D_{ACCn}$ indicates the accumulated dispersion associated with spans in the optical path subsequent the last compensation point and up to span n that have not been compensated.

For example, the supervisory channel is frequently unique to a particular span even if other channels carry through from span to span. Thus, a network element coupling a first span and a second span may terminate the first span supervisory channel while sourcing the second span supervisory channel on the same channel in the second span. The remaining optical channels may be routed from the first span to the second span without termination. Accordingly, some optical channels carried by the second span have dispersion accumulated from both the first and second spans even though measurements of the supervisory channel would not reflect such accumulated dispersion. A dispersion measurement using the second span supervisory channel fails to account for the uncompensated-for dispersion contributed by the first span to the remaining optical channels.

In one embodiment, the uncompensated-for accumulated dispersion is embedded as data within a channel carried by a subsequent span such that for any selected current span, both the dispersion associated with the current span and any dispersion contributed by prior spans can be gleaned from the current channel. In one embodiment, the information is embedded within the same channel used for detecting the amount of dispersion.

If compensation is provided at every network element, then there will not be any prior accumulated dispersion. Prior accumulated dispersion, however, must be accumulated at each network element that terminates the channel used for dispersion detection, if such network element terminates the channel prior to compensation. A supervisory channel of one span that is terminated and then generated for another span without intervening compensation is one example.

For any given span n, the amount of compensation to be provided is determined from:

$$D_T = \sum_{i=j}^{n} D_{Ci}$$

where $D_T$ represents the dispersion signal corresponding to the total amount of uncompensated-for dispersion and $D_{Ci}$ is the amount of dispersion attributable exclusively to span i. Due to the intervening channel terminations, however, uncompensated dispersion accumulated from spans prior to n (i.e., j to n-1) are embedded as prior accumulated dispersion as follows:

$$D_{ACCn} = \sum_{i=j}^{n-1} D_{Ci}$$

The dispersion for span n is detected as $D_{Cn}$. The dispersion to be provided is then $$D_T = D_{Cn} + \sum_{i=j}^{n-1} D_{Ci}$$
$$= D_{Cn} + D_{ACCn}$$

Notably, the accumulated dispersion may need to be tracked on a channel-by-channel basis unless the dispersion associated with other wavelengths is extrapolated from the dispersion associated with a tracked channel based on characteristics of the optical fiber.

Figure 5:
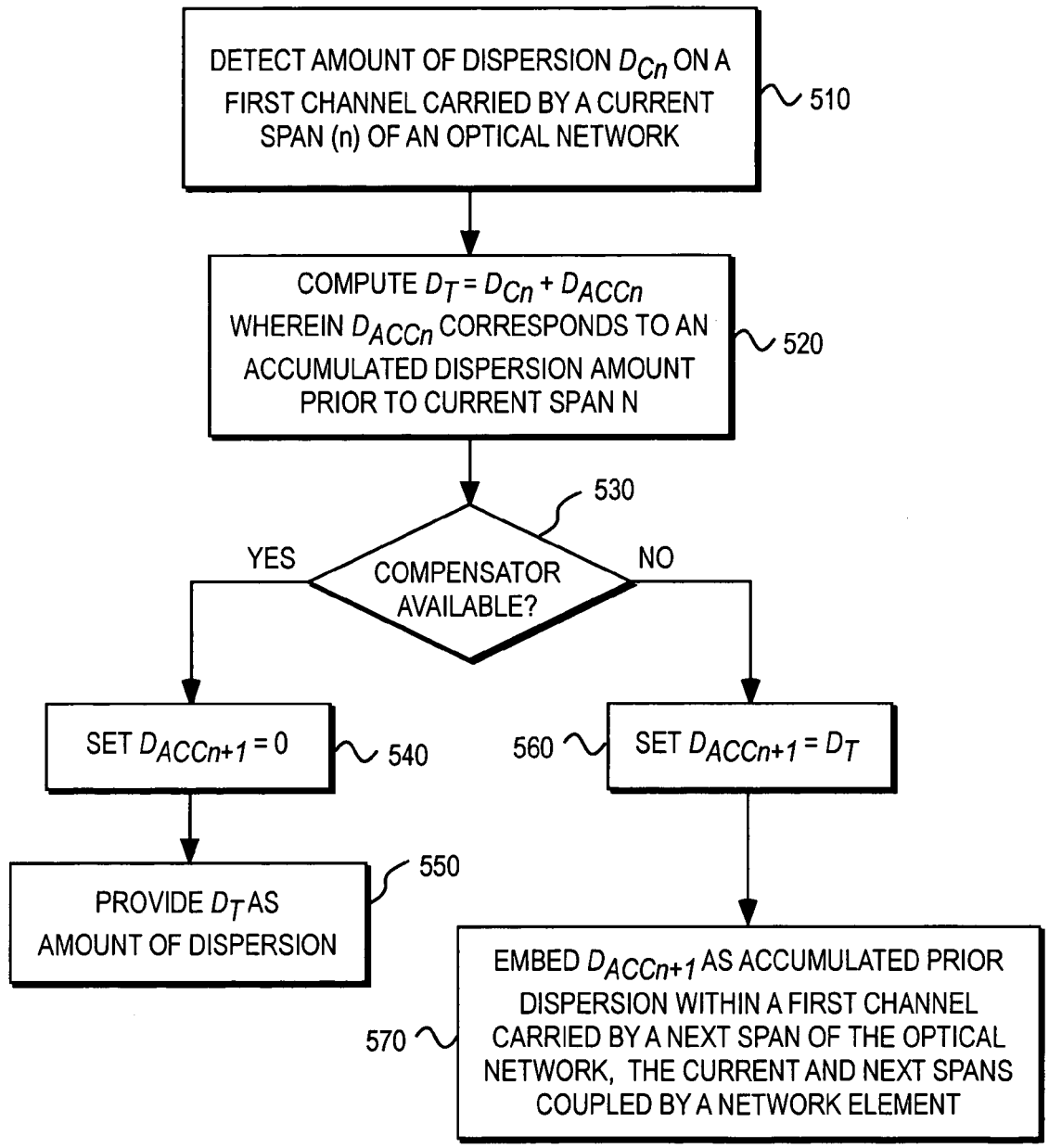
FIG. 5 illustrates one embodiment of a method for providing compensation when the channel used for dispersion measurement (e.g., supervisory channel) is terminated prior to compensation.

FIG. 5 illustrates one embodiment of a method for providing compensation when the channel used for dispersion measurement (e.g., a supervisory channel) is terminated prior to compensation. An amount of dispersion $D_{Cn}$ is detected on a first channel (i.e., prior to termination at a network element) carried by a current span (n) of an optical network in step 510. In step 520, the total amount of dispersion is computed as $D_T = D_{Cn} + D_{ACCn}$, wherein $D_{ACCn}$ corresponds to an accumulated dispersion amount prior to the current span. Step 530 determines whether a compensator is available such that the optical signal carried by the span might be compensated prior to termination at a network element.

If compensation prior to termination is possible, the accumulated prior dispersion for the next span is set to zero ($D_{ACCn+1} = 0$) in step 540. In step 550, $D_T$ is provided as the amount of dispersion to the compensator.

If compensation prior to termination is not possible, the accumulated prior dispersion for the next span is set to DT (i.e., $D_{ACCn+1} = D_T$) in step 560. In step 570, the accumulated prior dispersion is embedded within a first channel of the next span of the optical network, wherein the current and next spans are coupled by the network element.

Although the preceding examples are directed towards chromatic dispersion, the apparatus of FIG. 1 and the method of FIG. 2 may be used to address other forms of dispersion. For example, compensation may be provided for polarization mode dispersion or modal dispersion. Polarization mode dispersion tends to be of concern in legacy single mode fiber optical fibers. Modal dispersion may be of concern in multi-mode optical fibers. The compensation may also be provided for dispersion contributed by the network elements coupling optical fiber spans together.

In one embodiment, the dispersion compensation apparatus of FIG. 1 is incorporated into one or more network elements 180. Exemplary elements might include optical amplifiers, optical regenerators, add nodes, drop nodes, source nodes, or termination nodes. These types of devices can be placed in various locations along the light path, such as for example between amplifier stages, or in a fiber patch panel.

Greater network flexibility is achieved by measuring and compensating for chromatic dispersion on a network element-by-network element basis. For example, each network element of a plurality of network elements distributed within a communications network or portion thereof may be adapted to automatically determine the amount of accumulated dispersion present in a signal received by the network element or on which the network element is otherwise operating.

For a signal received by the network element, such accumulated dispersion may be principally attributed to dispersion that may occur on the fiber span that immediately precedes the network element (i.e., the fiber span through which the signal was received), although it is possible that other sources may have additional influence on the amount of accumulated dispersion. In this embodiment, each of the plurality of network elements administers an appropriate level of optical dispersion compensation at the network element to "zero-out" the accumulated dispersion measured by that network element.

Figure 6:
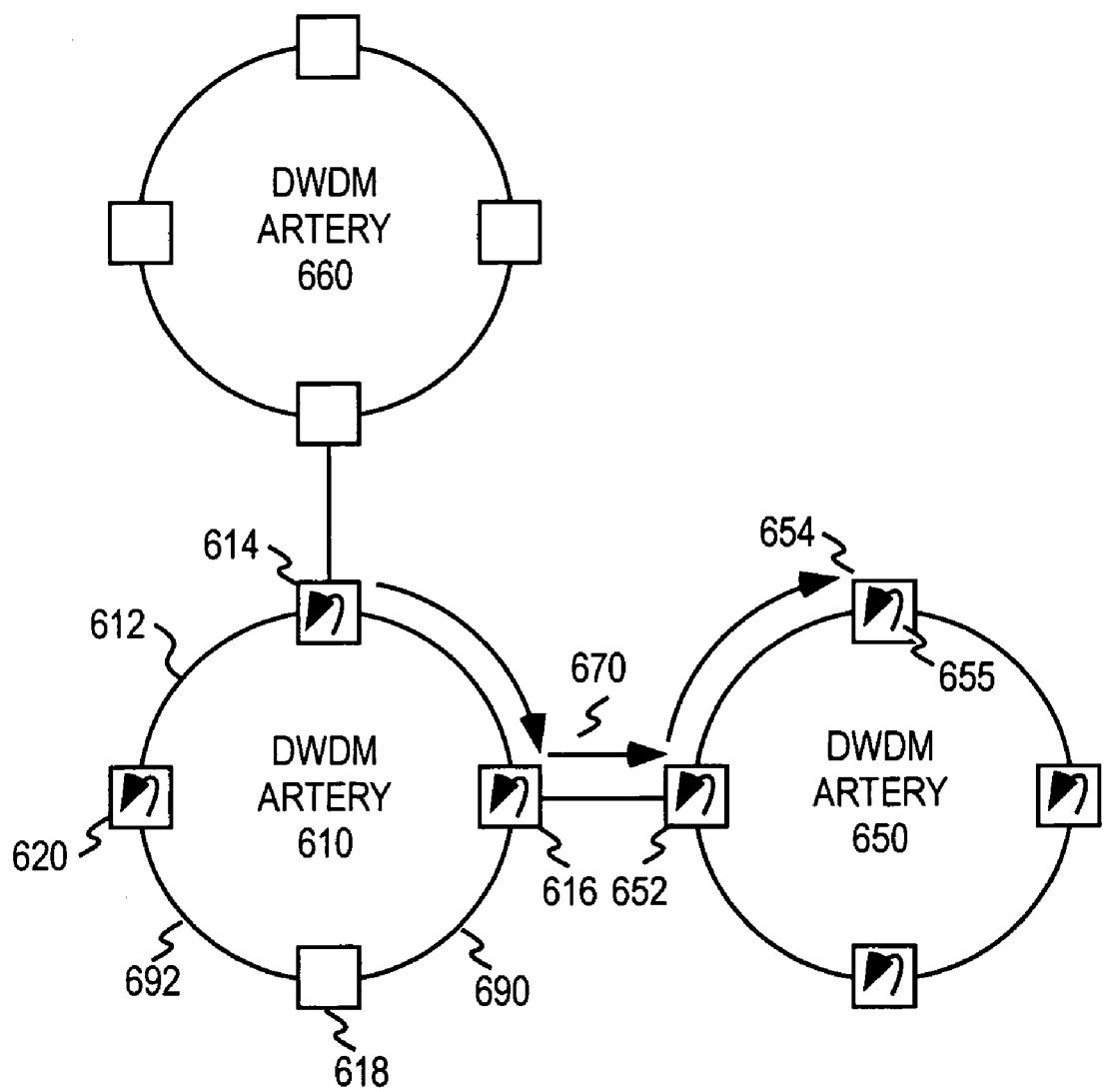
FIG. 6 illustrates one embodiment of an optical network including interconnected DWDM rings.

FIG. 6 below is a schematic representation of an example network of interconnected DWDM rings 610, 650, 660. The methods and apparatus described for detecting and providing dispersion compensation are not limited to this particular network topology, but rather can be used in a wide variety of network topologies. The network topology may be, for example, a point-to-point, linear chain, ring, interconnected ring (illustrated), mesh, or other topology. The network may include unidirectional or bidirectional optical spans.

In the illustrated embodiment, the rings include a plurality of network elements such as 614, 616, 652, and 654 connected by optical fiber spans such as 612. In one embodiment, the optical fibers are carrying WDM communications. In one embodiment, the spans support bi-directional communication between network elements at either end of the span.

The network elements may be perceived as both source nodes and terminating nodes. The network elements may include optical dispersion compensation or not. Network elements 614, 616, 620, 652, and 654, for example, provide dispersion compensation as denoted by the dispersion rollback indicator 655. Thus depending upon the direction of propagation of the optical communications, dispersion accumulating in span 612, for example, is compensated for by either network element 614 or 620.

Light path 670 begins with network element 614 of DWDM artery 610 and passes through network element 616 to network elements 652 and 654 of DWDM artery 650. In this embodiment, network element 614 is the source DWDM network element for light path 670 while network element 654 is the terminating network element. Due to the dispersion compensation provided by each intervening network element 616, 652, and terminating network element 654, the effects of chromatic dispersion have been substantially eliminated (i.e., "zeroed out") from the optical signal appearing at the terminating network element at the end of light path 670.

Network element 618 does not provide compensation. In the event that the supervisory channel of span 692 is not propagated through network element 618 and through span 690, while other channels are passed through network element 618 and carried by both spans, the uncompensated-for accumulated dispersion in the carried-through optical paths is not accurately reflected by the dispersion present in the supervisory channel of either span 690 or span 692. Thus referring to FIG. 5, network element 618 must embed the accumulated dispersion from the prior span (proceeding in the direction of propagation) into the supervisory channel.

Proceeding clockwise from 690 to 618 to 692, the supervisory channel carried by span 692 carries the embedded prior accumulated dispersion from span 690. Proceeding clockwise, network element 620 detects the dispersion contributed by span 692 by measuring the dispersion of the supervisory channel. The prior accumulated dispersion from 690 is extracted from the supervisory channel and added to the detected or estimated dispersion contributed by span 692. Network element 620 can then provide adequate compensation by compensating for the total uncompensated-for dispersion (i.e., prior accumulated dispersion from span 690 plus dispersion appearing in span 692).

Similarly, when proceeding counter-clockwise from 692 to 618 to 690, the supervisory channel carried by span 690 carries the embedded prior accumulated dispersion from span 692. Proceeding counter-clockwise, network element 616 detects the dispersion contributed by span 690 by measuring the dispersion of the supervisory channel. The prior accumulated dispersion from 692 is extracted from the supervisory channel and added to the measured dispersion contributed by span 690. Network element 616 can then provide adequate compensation by compensating for the total uncompensated-for dispersion (i.e., prior accumulated dispersion from span 692 plus dispersion appearing in span 690).

The elimination of the chromatic dispersion at network elements along the represented light path results in a light path whose total chromatic dispersion is substantially equal to, if not equal to, zero, while yielding a network that may be more readily and flexibly designed, deployed and operated. Indeed, the efficiencies and agilities of the network can meaningfully increase as more network elements (or other components) are deployed within the network.

An optical network incorporating the optical dispersion compensation apparatus and methods described can more readily accommodate time-varying traffic patterns, data rates, or other network parameters as well as different standard data rates and foreign optical wavelengths. Bandwidth is more efficiently used throughout the network and the need for transponder regeneration is reduced. Utilization of the described methods and apparatus can be used to eliminate optical dispersion, such as chromatic dispersion, as a network design restriction or other engineering parameter. Accordingly, overall network design, deployment, maintenance, and operation are simplified.

Methods and apparatus for providing dispersion compensation have been described. Various modifications and changes may be made thereto without departing from the broader scope of the invention as set forth in the claims. The specification and drawings are, accordingly, to be regarded in an illustrative rather than a restrictive sense.

What is claimed is:

1. A method comprising:
computing an amount of dispersion contributed by a first span of an optical network for at least one channel of a multi-channel optical signal;
accumulating the amount of dispersion into a prior accumulated dispersion, if the at least one channel is terminated prior to compensation;
providing a dispersion signal representing a sum of the prior accumulated dispersion and a dispersion of a current span of the optical network; and
controlling a dispersion compensator in accordance with the dispersion signal to optically compensate for the total dispersion of the optical signal, wherein the dispersion compensator comprises a plurality of cascaded single channel compensators.

2. The method of claim 1 wherein the multi-channel signal is carried by an optical fiber.

3. The method of claim 2 comprising:
tapping the optical fiber to provide a tapped optical signal.

4. The method of claim 3 comprising:
measuring an amount of dispersion for at least one channel of the tapped optical signal.

5. The method of claim 2 comprising:
estimating a length of the optical fiber from a propagation time of a signal communicated between a first network element and a second network element coupled by the optical fiber; and
estimating an amount of dispersion from the length L and a pre-determined dispersion characteristic $D_\lambda$ of the optical fiber, wherein the estimated amount of dispersion represents the computed amount of dispersion.

6. The method of claim 3 comprising:
measuring a difference in propagation times for distinct spectral components of a signal communicated on a first channel of the tapped optical signal.

7. The method of claim 1 wherein the dispersion signal corresponds to an amount of chromatic dispersion.

8. The method of claim 1 wherein the at least one channel is a supervisory channel.

9. The method of claim 1 wherein the dispersion compensator is controlled at pre-determined intervals of time to provide the optical compensation.

10. The method of claim 1 wherein the dispersion compensator is continuously controlled to provide the optical compensation.

11. The method of claim 1 wherein the optical dispersion compensation is provided without interruption of the multi-channel optical signal.

12. An apparatus comprising:
a dispersion calculator providing an amount of dispersion associated with at least one channel of a multi-channel optical signal carried by a first span of an optical network, the dispersion calculator accumulating the amount of dispersion into a prior accumulated dispersion, if the at least one channel is terminated prior to compensation; wherein the dispersion calculator provides an accumulated dispersion signal representing a sum of the prior accumulated dispersion and a dispersion of a current span of the optical network; and
a compensator controlled in accordance with the accumulated dispersion signal to optically compensate for total dispersion of the multi-channel optical signal, wherein the dispersion compensator comprises a plurality of cascaded single channel compensators.

13. The apparatus of claim 12 wherein the dispersion signal corresponds to a detected amount of dispersion, the apparatus further comprising:
a tap coupled to provide a tapped optical signal including the at least one channel from the multi-channel optical signal;
a detector measuring a difference in propagation times for individual spectral components of a signal carried by the tapped optical signal to detect an amount of dispersion associated with the at least one channel, wherein the detector provides the detected dispersion as the dispersion signal.

14. The apparatus of claim 12 wherein the optical signal is carried by an optical fiber.

15. The apparatus of claim 14 comprising:
a first network element and a second network element coupled by the optical fiber, wherein the first network element computes a length (L) of the optical fiber, wherein the dispersion calculator computes an estimated amount of dispersion from the length and a pre-determined dispersion characteristic $D_\mu$ of the optical fiber.

16. A method comprising:
computing an amount of dispersion on a first channel carried by a first span of an optical network;
accumulating the amount of dispersion into a prior accumulated dispersion, if the first channel is terminated prior to compensation, wherein the prior accumulated dispersion is embedded into the first channel of a second span of the optical network;
providing a dispersion signal representing a sum of the prior accumulated dispersion and a dispersion of a current span; and
controlling a dispersion compensator in accordance with the dispersion signal to optically compensate for total dispersion of the optical signal carried by the current span, wherein the dispersion compensator comprises a plurality of cascaded single channel compensators.

17. The method of claim 16 wherein the dispersion compensator comprises at least one of a micro-electromechanical systems (MEMS) mirror array, a fiber Bragg grating, a tunable etalon filter, a phase shifting planar waveguide, and a tunable diffraction grating.

18. An apparatus comprising:
a plurality of spans;
a plurality of network elements coupling the spans to form an optical communication network, wherein at least one network element incorporates:
a dispersion calculator providing an amount of dispersion associated with at least one channel of a multi-channel optical signal communicated on a current span terminated by the at least one network element, wherein the dispersion calculator provides a dispersion signal corresponding to an accumulated dispersion between a selected span and the at least one network element; and
a compensator controlled in accordance with the dispersion signal to optically compensate for accumulated dispersion of the optical signal, wherein the compensator comprises a plurality of cascaded single channel compensators.

19. The apparatus of claim 18 wherein the dispersion signal corresponds to a detected amount of dispersion associated with the optical signal.

20. The apparatus of claim 18 wherein the dispersion signal corresponds to an estimated amount of dispersion associated with the optical signal.

* * * * *